United States Patent [19]

Klose

[11] 4,189,277
[45] Feb. 19, 1980

[54] SUPPORTING AND HANDLING DEVICE FOR USE WITH A TIRE PROCESSING MACHINE

[75] Inventor: Karl W. Klose, Findlay, Ohio

[73] Assignee: Cooper Tire and Rubber Company, Findlay, Ohio

[21] Appl. No.: 826,691

[22] Filed: Aug. 22, 1977

[51] Int. Cl.² .............................................. B65G 47/90
[52] U.S. Cl. .................................. 414/664; 156/405 R; 414/222; 414/589
[58] Field of Search ............. 214/1 BB, 95 R, 16.4 R, 214/16.4 A, 16.4 B, 730; 156/126, 405 R; 414/669, 670, 671, 222, 589, 663, 664, 665, 666, 667, 668

[56] References Cited

U.S. PATENT DOCUMENTS

| | | | |
|---|---|---|---|
| 2,931,519 | 4/1960 | Beach | 214/1 D |
| 3,283,924 | 11/1966 | Chasar | 214/730 X |
| 3,439,815 | 4/1969 | Wagner et al. | 214/730 X |
| 3,447,697 | 6/1969 | Morey et al. | 214/730 X |
| 3,549,025 | 12/1970 | Messner | 214/730 X |
| 3,556,329 | 1/1971 | Johnston et al. | 214/730 |
| 3,632,001 | 1/1972 | Richens et al. | 214/730 |
| 3,892,324 | 7/1975 | Faletti | 214/730 |
| 3,934,741 | 1/1976 | Wentz | 214/730 |
| 4,013,186 | 3/1977 | Barton et al. | 214/1 BD X |
| 4,084,706 | 4/1978 | Russell | 214/652 X |

*Primary Examiner*—Frank E. Werner
*Attorney, Agent, or Firm*—Kemon and Estabrook

[57] ABSTRACT

A supporting and handling device located adjacent a tire processing machine for positioning and/or removing a tire, either in its cured or uncured state, to or from the holding device of said machine. The device is provided with an adjustable contoured surface that may be raised and lowered for handling said tire while same is being positioned upon or removed from the building drum or mandrel and while being moved to a position for further handling.

9 Claims, 8 Drawing Figures

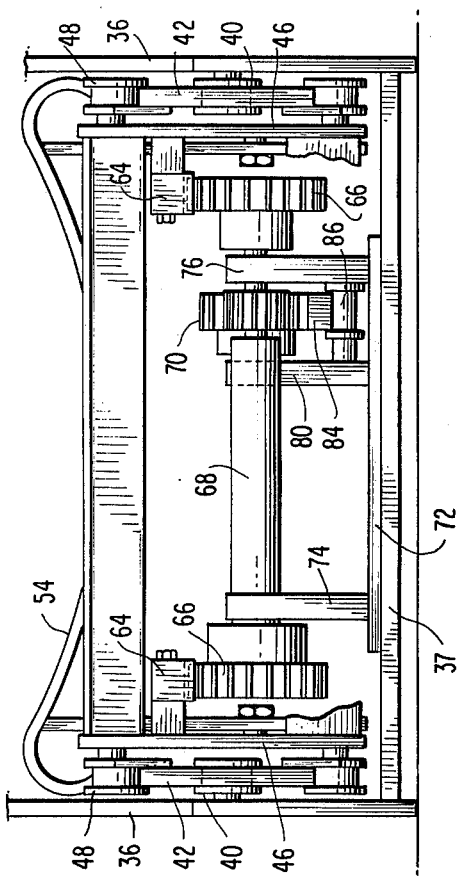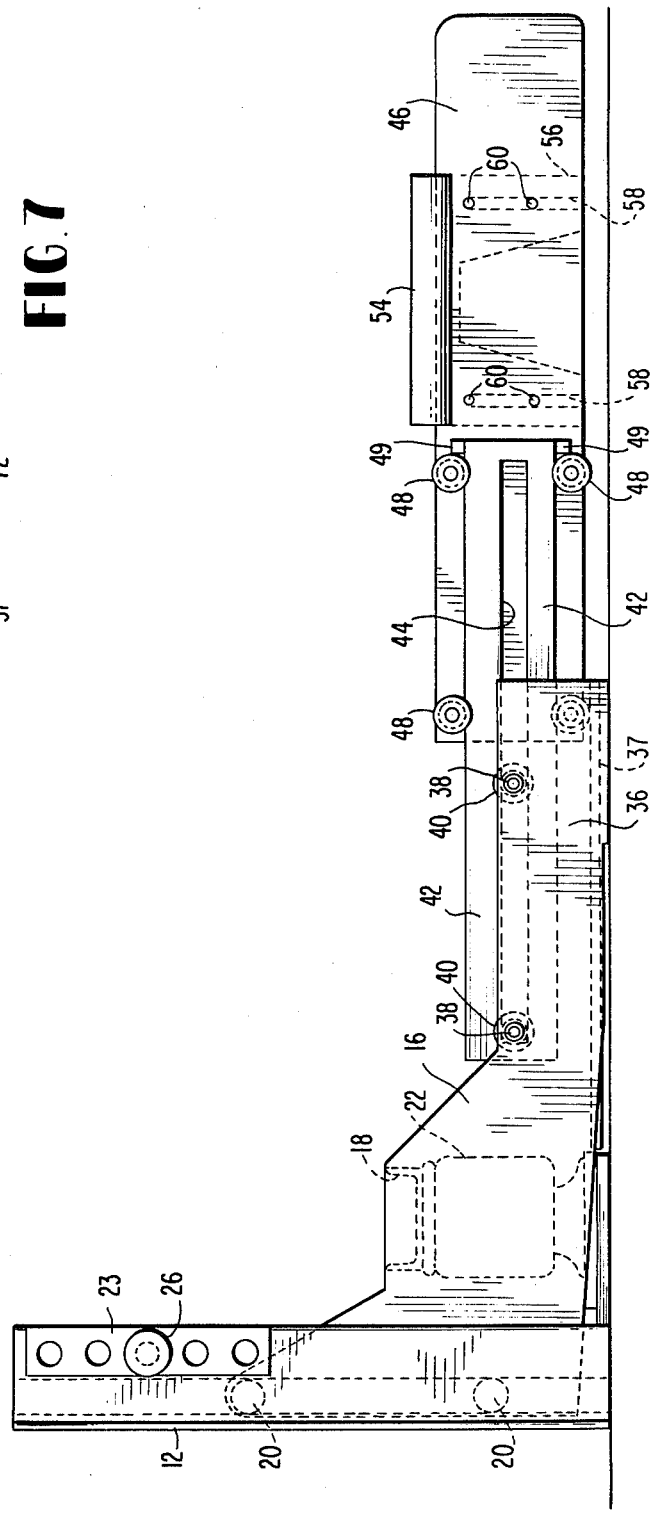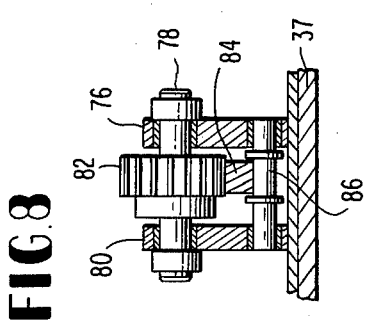

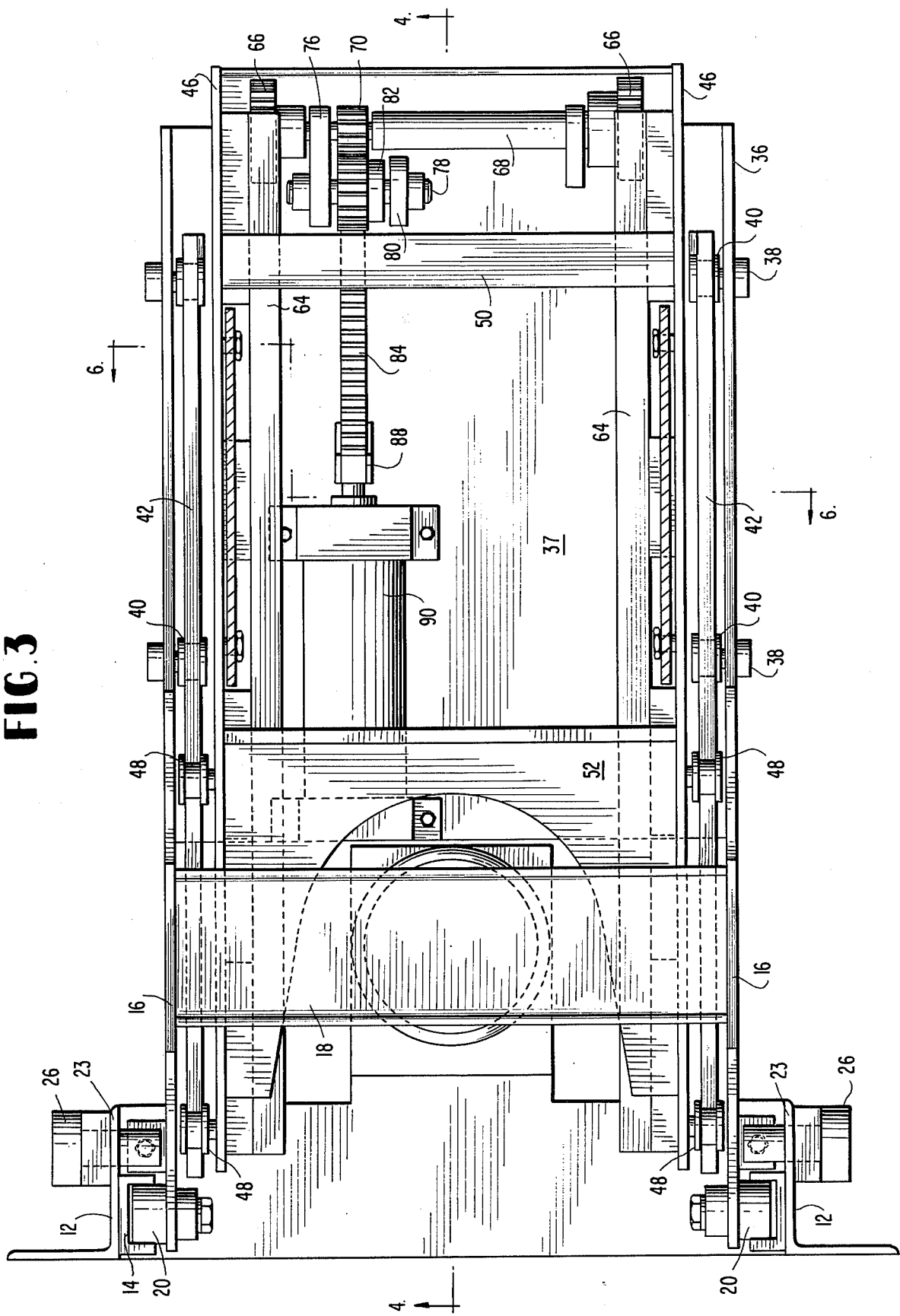

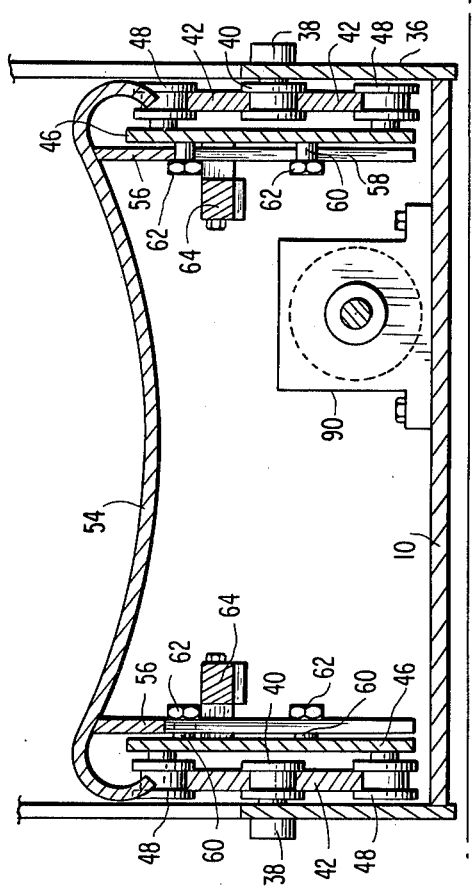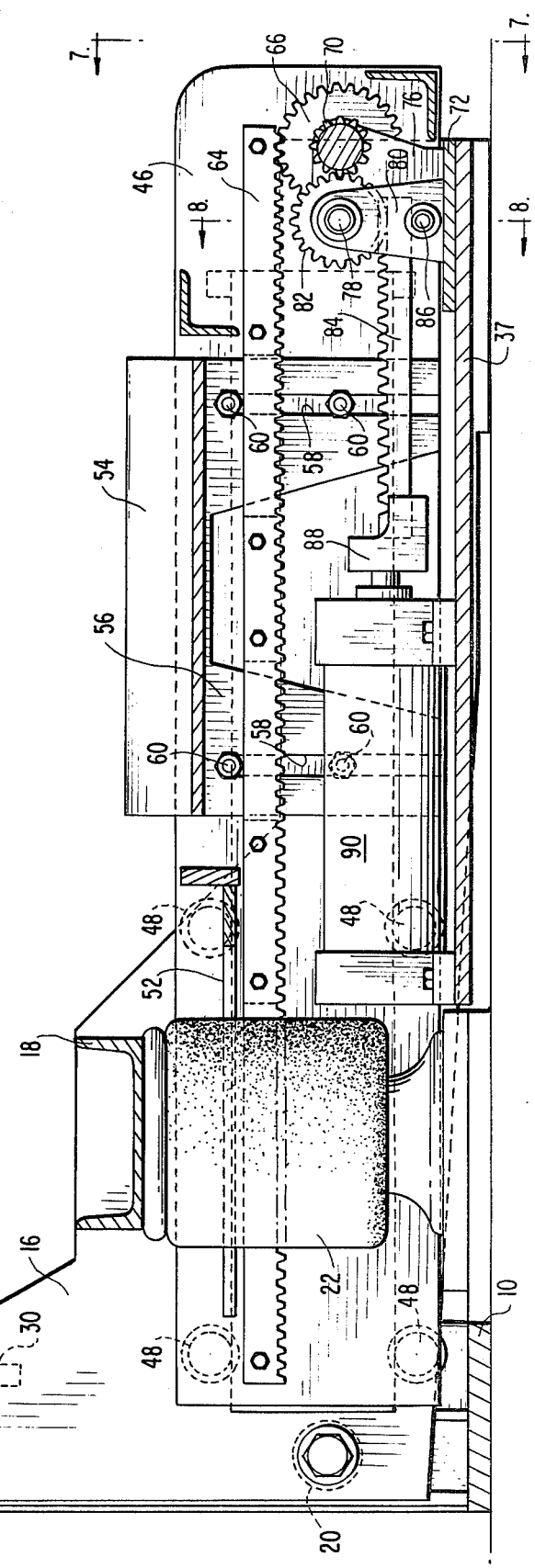

SUPPORTING AND HANDLING DEVICE FOR USE WITH A TIRE PROCESSING MACHINE

BACKGROUND OF THE INVENTION

This invention relates to plastic article shaping or the like and specifically to a tire building drum or mandrel and apparatus associated therewith.

In the building of a radial tire, a plurality of layers or plies of stock are positioned upon a rotatable drum or mandrel until such time as the material on the drum is forced to assume a torroidal shape. The cap belts and base stock are then placed upon the tire body after which they are subjected to a stitching operation. The then finished uncured green tire is ready for removal from the building drum or mandrel and the delivery of same to a storage or handling area or to a conveyor for subsequent manufacturing steps, such as vulcanizing. Uncured tires, especially truck tires and off-the-road machinery tires, by virtue of their weight and physical characteristics, are not only delicate but also cumbersome to the point that manually handling said tires becomes a laborious task.

The strength and ability of a green tire to withstand physical abuse is minimal to the extent that said tire is not capable of supporting its own weight when placed upon a planar surface. Thus, any surface that is adapted to receive green uncured tire bodies must be of either a flexible nature or have a dished or contoured surface that can readily conform to that of the tire or tires being moved. Furthermore, the physical properties of green rubber are those of a sticky, easily distorted plastic substance which will flow, become distorted, adhere to foreign substances and permit foreign bodies to become embedded therein.

In the tire building and processing field, the usual practice is to have the machine operator effect the removal of the tire and the delivery of same to a handling or storage area or to place same upon a conveyor to permit subsequent manufacturing steps or operations. Such a procedure does not entail any undue hardship or burden upon the operator as long as small size tires for passenger cars are being manufactured. In the manufacture of large truck tires, especially the all steel radial variety, as well as large off-the-road machinery tires, it has been customary to resort to the use of slings and cranes. The use of a sling, in combination with a hoist or crane, is time consuming and the utilization of same as a supporting means still requires great physical exertion on the part of the operator in effecting the manipulation and removal of such a tire from the building drum and if dropped, the tire becomes badly distorted due to its ductility and if moved in contact with the floor, said tire's surface will become contaminated with foreign matter.

SUMMARY OF THE INVENTION

The present invention is directed to a supporting device that is disposed adjacent a tire building drum for receiving from said drum a green uncured tire. The supporting device constitutes a dolly or caddy that is positioned near the head stock of the tire building machine and beneath the building drum or mandrel so as to be capable of receiving and supporting the green tire as it is either being removed from the drum or being positioned upon the drum.

The tire caddy or dolly of the present invention prevents the green uncured tire from becoming distorted through the use of a supporting surface of adequate area for contacting the tire. This arrangement reduces fatigue of the operator of the tire building machine, greatly reduces loading and unloading time for said machine, and greatly reduces the danger of injury inasmuch as the operator is not required to lift and manhandle a heavy green uncured tire. Thus, an object of the present invention is to provide a support having sufficient area to receive a green uncured tire from a tire building machine and/or support a green uncured tire while it is being positioned upon a tire building machine and to transport same to a position where it may be easily transferred to a subsequent handling means.

BRIEF DESCRIPTION OF THE DRAWING

FIG. 2 is a side elevational view showing the tire supporting device of FIG. 1 in a horizontally extended position;

FIG. 3 is a top plan view of the tire supporting device of the present invention;

FIG. 4 is a vertical sectional view of the tire supporting device, the view being taken on line 4—4 of FIG. 3;

FIG. 6 is a cross sectional view of the tire supporting device, the view being taken on line 6—6 of FIG. 3;

FIG. 7 is an end view of the tire supporting device with certain portions removed and other portions shown in sections in the interest of clarity, the view being taken on line 7—7 of FIG. 4; and FIG. 8 is a detailed vertical sectional view of a portion of the drive mechanism, the view being on the line 8—8 of FIG. 4.

DESCRIPTION OF THE PREFERRED EMBODIMENT

Figure 1:
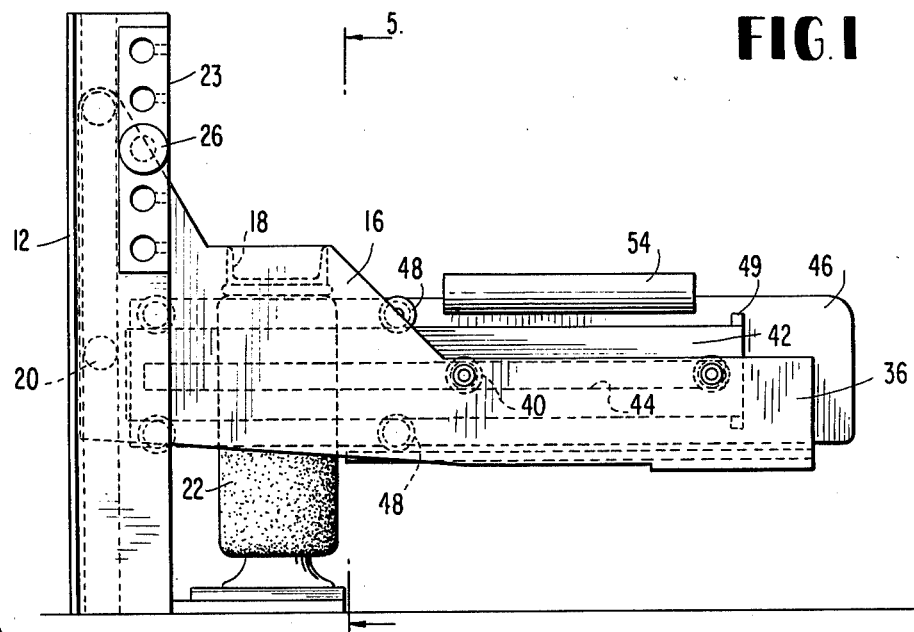
FIG. 1 is a side elevational view of a tire supporting device of the present invention in the vertically extended position.
Figure 5:
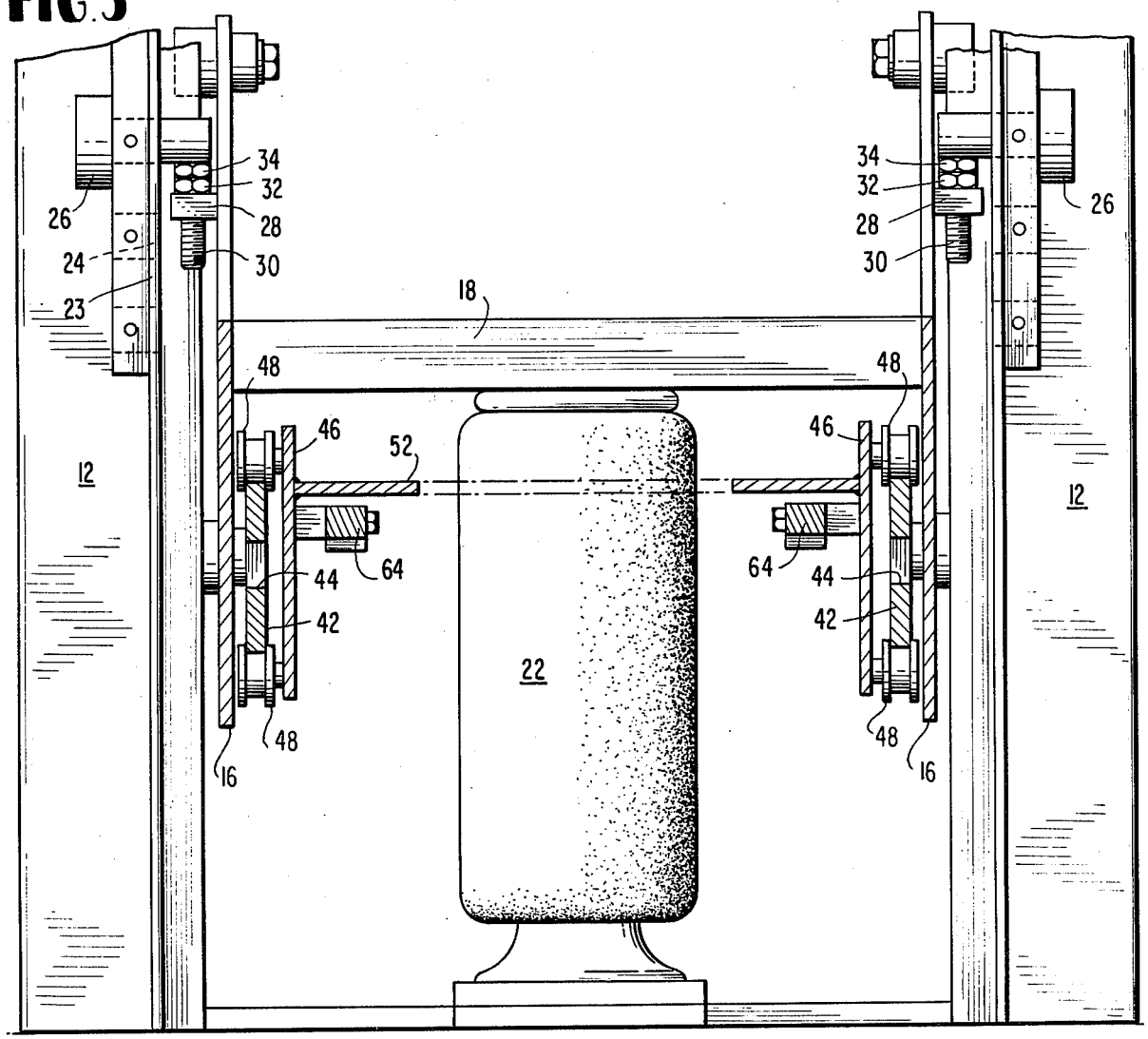
FIG. 5 is sectional view of the tire supporting device, the view being taken on line 5—5 of FIG. 1.

Referring to the drawings, there is shown in FIGS. 2 and 4, a tire supporting device of the present invention that is adapted to be positioned adjacent the building drum or mandrel end of a tire building machine, not shown. The supporting device includes a base member 10 having formed integrally therewith vertical upright elements 12 that are of channel configuration to define trackways 14. The supporting device includes a pair of vertically disposed side plate members 16 which are maintained in spaced parallel relation with one another by means of a transverse bracing member 18. The side plate members 16 are each provided with upper and lower rollers 20 which are positioned in the trackways 14 for movement therein under the action of a fluidic elevating device 22 of the rolling lobe pneumatic type which engages the lower surface of the transverse bracing member 18. The vertical upright elements 12 have segments 23 thereof projecting beyond trackways 14 and said segments 23 are provided with a plurality of spaced apertures 24 which are designed to receive a stop pin 26. The side plate members 16 each have mounted thereon a horizontally disposed boss or lug 28 that is drilled and tapped to receive a threaded pin 30 which, in turn, has a jam nut 32 provided thereon beneath the head 34. The boss or lug 28 and the threaded pin 30 are mounted on the side plate members 16 so as to be in vertical alignment with the segments 23 and the stop pin 26, so that upon the elevation of the side plate members 16 under the action of the elevating mechanism 22, the head 34 of the pin 30 will engage the stop pin 26 to limit the upward travel of the side plate members. The side plate members 16 terminate forwardly of the elevating mechanism 22 in a pair of reduced segments 36 which are provided with transversely extending bottom or bracing member 37, FIG. 4.

The segments 36 each have mounted therein a pair of spaced pins 38, FIGS. 2 and 3, which carry on their inner ends a roller 40. The rollers 40 support an elongated slotted plate 42 with the rollers being positioned within an elongated slot 44 in the center of the plate 42 so that said plate will be capable of being advanced and retracted with respect to the side plate members 16 shown in FIGS. 1 and 2. The plates 42, FIG. 2, in turn are each adapted to carry and support an inner plate 46 that is provided with a plurality of upper and lower rollers 48 that engage the upper and lower edges of said slotted plate 42. Thus, the inner plate is capable of being advanced and retracted with respect to the slotted plate 42 and the side plate members 16. The forward end of the slotted plate 42 is formed with stops 49 which are engaged by the forward rollers 48 on the inner plate member 46. Thus, movement of the inner plate 46 in a direction away from the segments 36 will cause the rollers 48 to engage the stops 49 and result in the movement of the slotted plate 42 under the action of said inner plate 46.

The forward end of the inner plates 46 are connected to one another by a transverse bracing member 50 with the rear ends of said inner plates 46 being connected by a plate 52 that is formed with a recessed or cut out portion which encircles the elevating mechanism 22. The forward bracing member 50 in conjunction with the plate 52 tends to maintain the inner plate members 46 in relatively rigid spaced parallel relation to one another. In addition, the inner plate members 46 have mounted thereon a contoured or dish shaped supporting plate-like element 54 which is adapted to receive and support a green uncured tire when same is being removed from or being positioned upon a tire building drum or mandrel of the tire building machine. The contoured shaped plate member 54 is provided at each side portion thereof with a depending flange 56, FIG. 4, which flanges are formed with a pair of spaced vertically extending slots 58 that, in turn, are adapted to receive pins 60 which are carried by the inner surface to the inner plates 46. The pins 60 are threaded to receive suitable nuts 62 so that said contoured shaped plate 54 may be vertically adjusted with respect to the inner plate members 46. This arrangement defines the lower limit of travel of the contoured shaped member 54 with respect to the inner plate members 46.

The inner plates 46 each have mounted on the inner surface thereof, an elongated rack bar or member 64 which is engaged by gears 66 that are mounted on a transversely extending shaft 68. The shaft 68 also has mounted thereon for rotation therewith a pinion gear 70. The bracing member 37 of the reduced segments 36 of the side plate members 16 is provided with a supporting plate 72, FIG. 4, and there is mounted thereon a pair of spaced pillow blocks 74 and 76 which constitute supports for the shaft 68. A second shaft 78 is disposed in spaced parallel relation to shaft 68 and has one end thereof supported by a pillow block 80. The second shaft 78 has mounted on the other end thereof a gear 82 which is engaged by a rack 84 that is interposed between said gear and a roller 86 mounted on the lower portion of the pillow block 80. The rack bar 84 is connected to a piston 88 which is disposed within a cylinder 90 mounted on the bracing member 37.

In the use of the supporting device of the present invention, the base member 10 is positioned adjacent a tire processing machine and the contoured shaped supporting element 54 is then vertically adjusted with respect to the inner plates 46 by means of the nuts 62 on the pins 60. Thus, the supporting element is adjusted depending upon the type of work that is to be performed, such as building a tire on a mandrel or finishing the building of a green uncured tire or the reconditioning of a used tire wherein same is to be retreaded or the like. In this manner, the supporting element 54 is adjusted to define its lower limit of travel. It is to be understood that the device of the present invention is readily usable in positioning completed or partially completed tires on the process machine in the same general manner that said items may be removed from said machine.

Upon the completion of the building of a tire and in order to effect its removal from the tire processing machine, the elevating mechanism 22 is actuated by fluidic means or the like so as to raise the transverse bracing member 18 in conjunction with the side plate members 16. In their elevated position, the plate members 16 through the head 34 of the adjusting pin 30 engages the stop pin 26 that has been positioned in one of the apertures 24 in the vertical upright elements 12, to limit the upward movement of the tire supporting element 54. This upward movement of the contoured supporting element 54 should bring said element into engagement with the lowermost portion of the tire on said machine so as to facilitate the removal of the tire therefrom.

The contoured supporting element 54 being in engagement with the green uncured tire and supporting same, the tire can then be effectively removed from the mandrel or holding means of the tire processing machine after which the cylinder 90 can be energized by suitable fluid means for moving the piston 88 outwardly from said cylinder and in turn, moving the rack bar 84 and the gears 82-70 and 66. The rotation of the gear 66 will cause the rack bar or member 64 to advance the inner plates 46 and to extend same with respect to the reduced segments 36 of the side elements 16 to the position as shown in FIG. 2. The extension of the inner plates 46 will cause the slotted plate 42 to be advanced by the rollers 48 engaging the stops 49. During this movement, the green uncured tire is supported by the contoured shaped plate element 54 and effectively moves said tire clear of the tire processing machine to a position wherein said tire can then be effectively transferred from said contoured supporting plate to a suitable storage area or to a conveyor for further processing.

Upon the removal of the green uncured tire from the contoured supporting element 54, the source of air to the cylinder 90 is reversed, so as to effect a retraction of the piston within said cylinder, which movement causes a retraction of the rack bar 84 and the inner plate members 46 and slotted plate 42 to a position within the reduced segments 36 of the side plate members 16 wherein the contoured supporting plate 54 then assumes the retractive position as shown in FIG. 1. The supporting plate 54 in conjunction with the side plate members 16 can then be lowered to the position as shown in FIG. 4 by permitting the source of fluid directed to the elevating mechanism 22 to return to a suitable sump or the like so that the rollers 20 will then move downwardly in the trackways 14 until the side plate members 16 engage the base 10.

Although, the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim:

1. An apparatus for supporting an item while transporting and positioning same at a work station and subsequently removing same therefrom, comprising:
   a base member having a pair of spaced upright elements provided with trackways;
   a pair of side members terminating in reduced end portions;
   a plurality of rollers provided on said side members adjacent the end opposite the reduced end portions for engaging said trackways;
   a bracing member connecting said side members intermediate said reduced end portion and the roller carried end;
   plate members disposed in spaced parallel relation to said side members;
   bracing members connected to said plate members for maintaining them in spaced parallel relation to one another;
   slotted plate members interposed between said side members and said plate members;
   means carried by said side members for supporting said slotted plate members for movement with respect to said side members;
   said plate members having rollers engagable with said slotted plate members for movement of said plate members in a plane parallel with respect to the plane of said side members;
   an upwardly facing supporting surface adjustably mounted on said plate members for vertical movement in a plane parallel to the plane of said upright elements with the movement of said surface being independent of the movement of said side members on said upright elements;
   an actuating member supported on said base member and engaging the bracing member for said side members for raising and lowering said side members and said slotted plate members and said plate members and said supporting surface on said upright elements; and
   means carried by said side members and engagable with said plate members for moving said plate members and said slotted plate members and said supporting surface between said side members towards and away from said upright elements while supporting said item on said supporting surface.

2. An apparatus as set forth in claim 1 wherein said bracing members for said plate members are positioned at the ends of said plate members with one of said bracing elements being configured to partially encircle said actuating member and permit said plate members to move between said side members towards said upright elements.

3. An apparatus as set forth in claim 1 wherein said supporting surface is formed with a dished contoured surface.

4. An apparatus as set forth in claim 1 wherein said supporting surface is provided with depending flanges having slots therein for receiving pins carried by said plate members with fastening means engaging said pins.

5. An apparatus as set forth in claim 1 wherein said upright elements are provided with adjustable stop members, an adjustable pin member carried by said end of said side members and engagable with said stop members to limit the travel of said members on said upright elements.

6. An apparatus as set forth in claim 1 wherein the reduced end portion of said side members are provided with spaced pins having rollers mounted thereon with the rollers being positioned within the slots of said slotted plate members.

7. An apparatus as set forth in claim 6 wherein the inner face of said plate members have racks secured thereto in spaced relation therewith and actuating means supported by said side members and engaging said racks for advancing and retracting said plate members and said slotted plate members towards said upright elements between said side members.

8. An apparatus as set forth in claim 7 wherein said actuating means includes a cylinder and piston with a rack member and pinions mounted on a shaft supported upon a bracing member for said reduced end portions for engaging said racks to advance and retract said plate members.

9. An apparatus as set forth in claim 8 wherein said bracing member has a plurality of pillow blocks supported thereon with shafts mounted in said blocks and gears mounted on said shafts with certain of said gears engaging said racks secured to said plate members and other gears being actuated by said piston and cylinder.

* * * * *